United States Patent [19]

Cassady et al.

[11] Patent Number: 5,232,277
[45] Date of Patent: Aug. 3, 1993

[54] ENCLOSURE FOR HOLDING ELECTRICAL COMPONENTS AND THE LIKE

[75] Inventors: Troy S. Cassady, Neptune Beach, Fla.; William D. Boehmer, Clairton, Pa.

[73] Assignee: Robroy Industries, Inc., Verona, Pa.

[21] Appl. No.: 838,052

[22] Filed: Feb. 19, 1992

[51] Int. Cl.[5] .......................... A47B 95/00; E05D 5/00
[52] U.S. Cl. .................................... 312/296; 312/100; 16/221
[58] Field of Search ............... 312/296, 100, 101, 102, 312/262, 902; 16/221, 387

[56] References Cited

U.S. PATENT DOCUMENTS

| | | | |
|---|---|---|---|
| 1,668,595 | 5/1928 | McAuliffe | 16/221 |
| 2,061,672 | 11/1936 | Ringel | 312/296 |
| 2,573,885 | 11/1951 | Whitman et al. | 312/296 |
| 2,656,948 | 10/1953 | McGee | 312/100 |
| 3,279,871 | 10/1966 | Bright | 312/296 |
| 3,912,348 | 10/1975 | Seymour | 312/100 |
| 4,223,965 | 9/1980 | Palandrami | 312/100 |
| 4,454,889 | 6/1984 | Contreras, Sr. | 132/82 R |
| 4,569,460 | 2/1986 | Bondy | 220/375 |
| 4,638,909 | 1/1987 | Ford | 206/1.7 |
| 4,671,943 | 6/1987 | Wahlquist | 422/300 |
| 4,917,131 | 4/1990 | Contreras, Sr. | 132/301 |

FOREIGN PATENT DOCUMENTS 3446809 7/1986 Fed. Rep. of Germany ........ 16/387
7500739 7/1976 Netherlands .

Primary Examiner—Victor N. Sakran
Attorney, Agent, or Firm—Webb, Burden, Ziesenheim & Webb

[57] ABSTRACT

An improved enclosure including the use of a seamless urethane gasket which is continuous and formed in situ on a planar surface, with no requirement for the gasket to be formed in a groove or for additional backing structure to be added. The enclosure also includes the use of concealed hinge with cutouts positioned on the door to permit at least a 180° swing. The hinges are located outside of the sealing surface and do not overlap it, permitting the entire opening to be used, such that a full front window may be incorporated into the door without interference from the hinges.

10 Claims, 1 Drawing Sheet

ENCLOSURE FOR HOLDING ELECTRICAL COMPONENTS AND THE LIKE

BACKGROUND OF THE INVENTION

The present invention relates to an improved enclosure, more specifically to an improved metal enclosure for holding electrical components and the like providing a sealed environment in the interior of the enclosure.

Enclosures for electrical components and the like are well-known in the art. However, these known enclosures have been unable to meet the needs and requirements of the marketplace. It has been reported that among the most important of the several factors which are dramatically changing the manner in which enclosure manufacturers satisfy the needs of high-tech industries in the '90s is the overall aesthetic appeal of the enclosure. The cabinet is not simply an outside for a company's electronic insides, it is a major aesthetic marketing tool and an important equipment protection and isolation device. It has been stated that appearance continues to be a very important consideration in cabinet design, with current trends leaning toward a more ergonomic look. Recent studies of enclosure users have reported a desire for a cleaner look, including a reduction of visible seams, a blending of exposed hardware into the overall design and a switch to hidden hinges. See Jay R. Manwaring, *Product Design and Development*, "Enclosures", Pages 21-23 (Nov. 1991).

The presently existing enclosures often utilize an exterior piano type hinge or exterior mounted pin and sleeve hinges that allow the cover to be lifted off. These exterior mounted hinges have the advantage of being easy to design and assemble; however, they interrupt the continuous line on the exterior of the enclosure disrupting the overall aesthetic quality of the enclosure. Furthermore, these exterior hinges protrude from the side of the enclosure creating an extension upon which clothing, tools, machinery and the like may become caught or snagged.

Interior hinges have also been utilized in enclosures for electrical components and the like. However, internal hinges have limited the range of motion of the door. Due to this limited range of motion of the door, access to the interior of these enclosures with internal hinges is somewhat restricted.

Other enclosures have been designed to alleviate these problems by eliminating hinges altogether. The door, or lid, is merely positioned and latched onto the enclosure body. This arrangement has proved unsatisfactory because upon opening the enclosure the removed door portion must be placed somewhere, and there is not always an appropriate place to temporarily store the removed door portion, nor is it convenient for the user to hold the door while operating in the interior of the enclosure. Furthermore, since the door is not attached to the enclosure, it becomes possible to misplace the door. The interior of enclosure doors have been utilized as a valuable mounting and storage location for tools, spare parts and equipment. A removable hingeless door eliminates this as a practical location for article storage.

The doors of enclosures for electrical components and the like include a sealing gasket to provide a sealed environment in the interior of the enclosure. The prior art enclosures most commonly utilize a neoprene gasket. A neoprene gasket is formed from several strips of neoprene placed around the periphery of the sealing surface. Generally, a reinforcing structure is provided to help maintain the neoprene gasket in position as well as to adequately locate the intended position of the neoprene gasket. The reinforcing structure can be a flange spot welded to the door or a groove formed in the door in which the neoprene gasket will be positioned. Neoprene gaskets have several drawbacks. Adjacent strips of the neoprene gasket must be positioned with tight tolerances and further sealed to eliminate seepage through this joint. Neoprene gaskets tend to acquire a compression set over time, meaning that the gasket will begin to take the shape of the sealing surface in which it is clamped against during an unclamped state. Consequently, through continued use, the clamping force needed to seal the door will have to be increased to obtain the required seal.

Silicone gaskets have also been utilized in providing sealing for enclosures. Silicone provides the advantage that it can be positioned in a continuous bead. However, silicone provides a relatively hard sealing gasket, takes longer to cure than normally utilized neoprene gaskets and also tends to form a compression set over time. Due to the relative hardness and the compression set of the silicone gasket, a greater number of latches and higher clamping force are needed with enclosures using silicone gaskets.

SUMMARY OF THE INVENTION

It is the object of the present invention to overcome the aforementioned drawbacks of known enclosures. It is a further object of the present invention to provide an enclosure with an improved sealing means which is easily manufactured. It is another object of the present invention to provide an improved enclosure having uninterrupted, flush exterior lines, thereby improving the safety and aesthetic considerations of the enclosure. It is a further object of the present invention to provide an enclosure which allows for at least a 180° door swing, thereby providing maximum access to the enclosure interior. The present invention obtains these objects by providing an enclosure which includes narrow interior hinges mounted to a front surface of the enclosure. These hinges provide for pivotably attaching the door to the enclosure body. The door is provided with cutouts which cooperate with the hinge to allow for greater than 180° of motion of the door. An access opening is positioned in the front surface of the enclosure body and a rim and sealing flange is attached to the front surface of the enclosure body positioned adjacent to and surrounding the access opening. A continuous urethane sealing gasket is formed on a flat interior surface of the door and cooperates with the sealing flange. The substantially narrow hinge structure allows for a conveniently large access opening to be positioned in the front surface of the enclosure. The sealing flange provides a flat planar sealing surface which the urethane gasket may be sealed against.

The utilization of an interior hinge provides for a flush exterior appearance of the enclosure. This improves the safety and the overall aesthetic quality of the enclosure. The specific narrow hinges, together with the associated cutouts, allow for door motion in excess of 180°, providing easy maximum access to the interior of the enclosure. A pin and loop type hinge is provided to allow for easy replacement and removal of the door through removal of the hinge pins.

A continuously formed urethane gasket improves the sealing arrangement of the enclosure. The urethane gasket does not require a supporting structure and is formed in one continuous step, thereby minimizing the manufacturing time required. A continuous seal eliminates the problem of leakage through adjacent portions of the seal. Furthermore, the use of urethane improves the sealing because urethane maintains its resiliency over time, thereby resisting compression sets. Due to this maintained resiliency and lack of compression set, the clamping force needed to properly seal the enclosure is less than with previous seals and, therefore, the number of latches required is reduced. This improves both the manufacturing cost and the appearance of the enclosure.

Specifically, the objects of the present invention are obtained by providing an improved enclosure for holding electrical components and the like which includes a body for defining the interior of the enclosure. The body includes a back surface, a top surface and a bottom surface attached to the back surface, a pair of side surfaces attached to the back surface and extending between the top surface and the bottom surface, a front surface positioned substantially in a plane attached to the top, bottom and both side surfaces. An access opening is positioned in the front surface with a rim attached to the front surface adjacent the access opening and a sealing flange attached to the rim positioned substantially in a plane which is spaced from and parallel to the plane of the front surface. A door is provided for closing the enclosure which is pivotably attached to the body. The door includes a door face positioned substantially in a plane, with four end faces attached to peripheral edges of the door face and positioned substantially orthogonal to the door face. A seal is attached to the interior surface of the door face and is adapted to engage the sealing flange to seal the enclosure. A pair of hinges are attached to the front surface for pivotably attaching the door to the body and provide a pivot axis for the door. The pivot axis for the door is positioned between the plane of the sealing flange and the plane of the front surface and also positioned parallel to two of the end faces of the door and located between these two end faces. Cutouts are provided on one of the end faces and cooperate with the hinges to allow for pivotable movement of the door greater than 180°.

The enclosure is provided with at least one latch to securely fasten the door to the enclosure body. A variety of latches may be employed for this purpose. For example, link lock latches, luggage latches and 90° or 180° cam lock latches may be utilized.

A window may optionally be incorporated into the door if desired. The hinges are located outside of the sealing surface and do not overlap it, thereby allowing a full-sized window corresponding approximately to the same size as the access opening to be used. The window is designed for flush mounting appearance from the exterior of the door.

These objects, as well as other novel features and advantages of the present invention, will become more apparent and better appreciated when the following description of the preferred embodiment is read along with the accompanying drawings.

DESCRIPTION OF THE PREFERRED EMBODIMENTS

Figure 1:
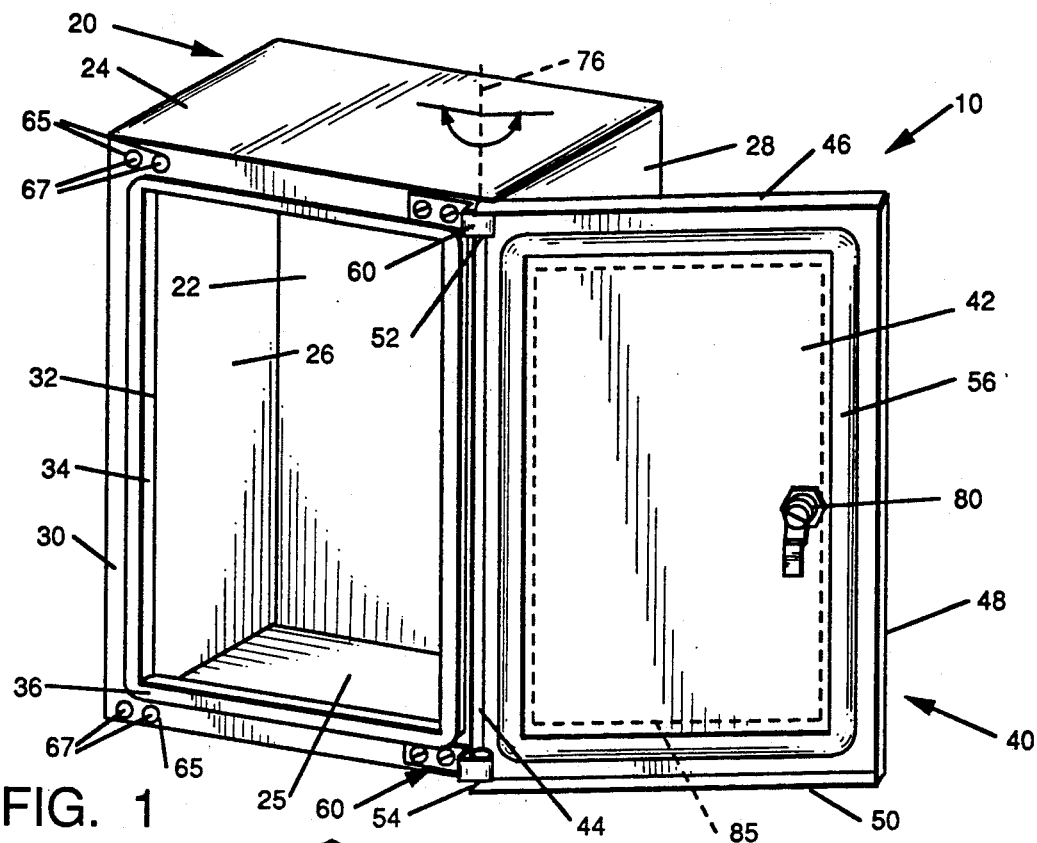
FIG. 1 is an elevational view of an opened enclosure of the present invention.

The National Electrical Manufacturing Association, NEMA, has developed a rating system for rating and testing enclosure types. A rating of 4X requires that the enclosure be either of indoor or outdoor use which will provide a degree of protection against falling rain, splashing water and hose-directed water. Furthermore, the enclosure must be undamaged by the formation of ice on the enclosure and must be resistant to corrosion. The enclosure 10 of the present invention shown in FIG. 1 is designed to satisfy the NEMA 4X standard.

The enclosure 10 of the present invention is comprised of a body 20, a door 40, hinges 60 and a securing latch 80.

The body 20 can be attached to the wall or other appropriate structure through conventional mounting means attached to back surface 22. Shown in FIG. 1 is a substantially rectangular body 20, although other body shapes are possible. In the embodiment shown in FIG. 1, top surface 24 and bottom surface 25 are attached to the back surface 22 and are positioned substantially orthogonal to the back surface 22 and substantially parallel to each other. A pair of substantially parallel side surfaces 26 and 28 are attached to the back surface 22 and extend between the top surface 24 and the bottom surface 25. The side surfaces 26 and 28 are positioned to be substantially orthogonal to the top surface 24, the bottom surface 25 and the back surface 22. A front surface 30 lies substantially in a plane and is attached to the side surfaces 26 and 28, the top surface 24 and the bottom surface 25. The front surface is positioned to be substantially orthogonal to the top surface 24, the bottom surface 25 and the side surfaces 26 and 28. The enclosure interior is defined by these surfaces. Stainless steel has proven satisfactory in forming the body surfaces.

An access opening 32 is positioned within the front surface 30. The access opening 32 is shown as substantially rectangular and is as large as possible to allow for convenient, easy access to the enclosure interior. The access opening is surrounded by a rim 34 which is attached to the front surface 30. The rim 34 extends around the entire periphery of the access opening 32. The rim 34 may be formed from the same material as the surface portions of the body 20, may be formed integrally therewith and is positioned to be substantially perpendicular to the front surface 30. A flat sealing flange 36 is positioned around the entire periphery of the rim 34 and is positioned in a plane which is spaced from and substantially parallel to the plane defined by the front surface 30. The sealing flange 36 is substantially made from the same material as the rim 34 and may be formed integrally with the rim 34.

The door 40 is pivotably attached to the body 20. The door 40 has also been designed for easy removal and replacement as needed. The door 40 includes a door face 42 having the general shape of a rectangle with planar surfaces. Four end faces 44, 46, 48 and 50 are attached to the door face 42 at the peripheral edges of the door face 42. The end faces 44, 46, 48 and 50 are positioned to be substantially perpendicular to the plane of the door face 42 with each end face being parallel to another end face on an opposite edge of the door face 42. Cutouts 52 and 54 are positioned in the end face 44 which is positioned adjacent the body 20.

A continuously formed urethane seal 56 is positioned on the interior of door face 42. The urethane seal 56 is formed in situ and is positioned to engage the entire circumference of the sealing flange 36 when the door 40 is in a closed position. No additional structure is required to support or locate the urethane seal 56. The urethane seal 56 is positioned to tightly seal against the sealing flange 36 when the enclosure 10 is closed.

Figure 2:
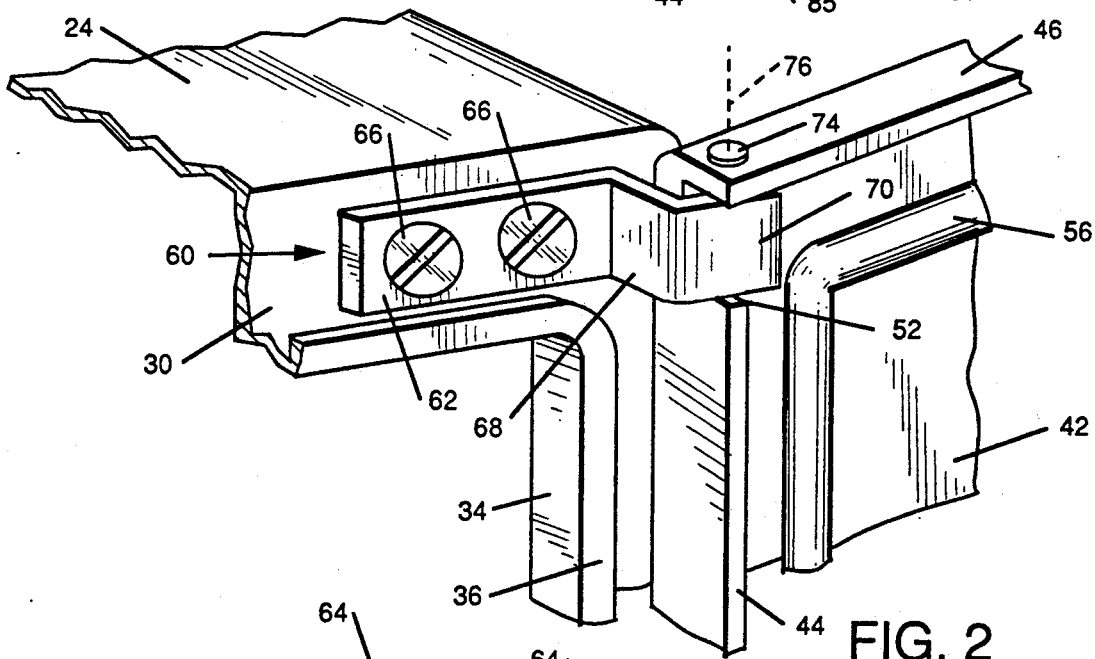
FIG. 2 is an enlarged view of a portion of FIG. 1.

Two hinges 60 are provided to pivotably attach the door 40 to the body 20. Each hinge 60 includes a mounting flange 62 which may be attached to the front surface 30 in any conventional fashion. One such method of attaching the hinge to the front surface 30 is through use of mounting holes 64 which are countersunk to provide for a flush appearance of attaching flat head mounting screws 66 (shown in FIG. 2). The mounting screws 66 will also engage with mounting holes 65 provided in the front surface 30 of body 20. Mounting holes 65 may be provided near all four corners of front surface 30 to allow for reversible mounting of the door 40. The hinges 60 and the door 40 may be mounted on the left or right of the enclosure 10 to allow the door 40 to open to the left or right as desired. The mounting holes 65 may be sealed with plugs 67 when not utilized to mount hinges 60 to maintain a sealed environment with enclosure 10. It should be understood that the door 40 will be reversed, or pivoted 180°, when mounted on the opposite side; for example, end face 50 will be adjacent top surface 24 and end face 46 will be adjacent bottom surface 25 when the door 40 is attached to the left side of enclosure 10. The reversibility of the mounting of door 40 adds greater flexibility to the use of the enclosure 10.

Figure 3:
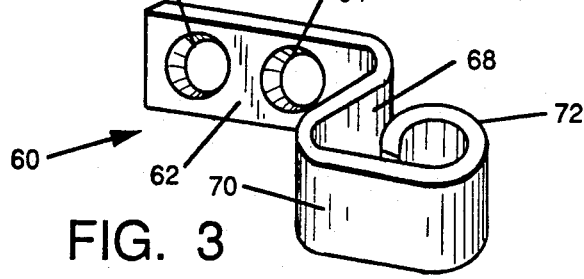
FIG. 3 an elevational view of a hinge utilized in the enclosure illustrated in FIG. 1.

As best shown in FIG. 3, each hinge 60 includes a plate 68 attached to and extending from the mounting flange 62 with the plate 68 positioned substantially perpendicular to the mounting flange 62. A second plate 70 is attached to the first plate 68 and positioned substantially perpendicular to the first plate 68 and includes a loop 72 attached to a distal end of the second plate 70. The loop 72 rotationally supports a hinge pin 74 (see FIG. 2, the hinge pin 74 has been omitted from FIG. 1 for clarity) which defines the rotational pivot axis 76 of the door 40. The pin 74 is attached to the door by any conventional fashion.

The hinge pins 74 may be provided to be easily removable from the door 40 such that the door 40 may be easily replaced or removed as needed. It should be noted that the hinge 60 is constructed to be narrow such that the access opening 32 may be provided as large as possible. The hinge is located outside of the sealing surface defined by the sealing flange 36 and the urethane seal 56 and does not overlap it, permitting the entire opening to be used.

The pivot axis 76, defined by the hinge 60 is positioned substantially parallel to two of the end faces, 44 and 48, of the door 40. The pivot axis 76 is also positioned to be between the plane defined by the front surface 30 and the plane defined by the sealing flange 36 such that the closure of the door 40 will provide for a secure engagement between the seal 56 and the sealing flange 36. The pivot axis 76 is positioned between the two end faces 44 and 46 with which it is substantially parallel.

The second plate 70 of the hinge 60 is adapted to be received in the cutouts 52 and 54 formed in the end face 44 of the door 40 to provide for a range of motion of the door 40 greater than 180°.

Although a variety of latching mechanisms may be incorporated into the enclosure of the present invention, FIG. 1 illustrates a single latch 80 which is centered along the vertical edge of the door face 42. Stainless steel has proven to be a satisfactory and preferred latch material for the enclosure meeting the NEMA 4× standard. The mounting of the latch 80 to the door 40 is sealed so as not to compromise the integrity of the sealed enclosure system.

A window 85 (shown in FIG. 1) may optionally be incorporated into the door. The window may be of any size desired up to and including a window sized approximately to the same size as the access opening 32.

Although the invention has been described with particularity above, with reference to particular shapes, structures and materials, the invention is to be limited only insofar as is set forth in the accompanying claims.

We claim:

1. An improved enclosure for holding electrical components and the like comprising:

a body means for defining the interior of said enclosure which comprises a back surface, a top surface and a bottom surface attached to said back surface, a pair of side surfaces attached to said back surface and extending between said top surface and said bottom surface, a front surface positioned substantially in a plane and attached to said top surface, said bottom surface, and said pair of side surfaces, an access opening positioned in said front surface, a rim attached to said front surface adjacent said access opening, a sealing flange attached to said rim and positioned substantially in a plane which is spaced from said plane of said front surface;

a door means for closing said enclosure which is pivotably attached to said body means and which comprises a door face positioned in substantially a plane, four end faces attached to said door face and positioned substantially orthogonal to said door face, sealing means attached to an interior surface of said door face adapted to engage said sealing flange to seal said enclosure; and at least one hinge means attached to said front surface for pivotably attaching said door means to said body means and providing a pivot axis for said door means which is positioned between the plane of said sealing flange and the plane of said front surface, said pivot axis is also positioned substantially parallel to two of said end faces and said pivot axis is positioned between these two of said end faces throughout the pivotable movement of said door means, and a cutout provided on one of said end faces for each said hinge means, with each said cutout adapted to receive a corresponding said hinge means to allow for pivotable movement of said door means greater than 180°.

2. The enclosure of claim 1 wherein latch means are provided to securely fasten the door means to the body means.

3. The enclosure of claim 1 wherein said sealing means comprises a continuous urethane seal formed in situ on said door face.

4. The enclosure of claim 1 wherein a window is provided in said door face which is substantially the same size as said access opening.

5. The enclosure of claim 1 wherein each said hinge means comprises a mounting flange substantially parallel to and attached to said front surface, a first plate attached to said mounting flange substantially orthogonal to said mounting flange, a second plate attached and substantially orthogonal to said first plate, a loop attached to said second plate, a pin pivotably positioned within said loop defining said pivot axis and attached to said door means.

6. The enclosure of claim 5 wherein said second plate of each said hinge means is adapted to be received within one of said cutouts.

7. The enclosure of claim 1 wherein mounting means are provided for attaching said hinge means to allow for pivotally attaching said door means to said body means removably in one of two orientations.

8. An improved enclosure for holding electrical components and the like comprising:

a body means for defining the interior of said enclosure which comprises, a metal back surface, a metal top surface and a metal bottom surface substantially parallel to each other and attached to and substantially orthogonal to said back surface, a pair of metal side surfaces substantially parallel to and spaced from each other, and which are attached to said back surface and extending between said top surface and said bottom surface and positioned substantially orthogonal to said back surface, said top surface and said bottom surface, a metal front surface positioned substantially in a plane and attached to said top surface, said bottom surface, and said pair of side surfaces, and positioned substantially orthogonal to said top surface, said bottom surface, and said pair of side surfaces, a substantially rectangular access opening positioned in said front surface, a metal rim integrally attached to said front surface adjacent said access opening and extending completely around said access opening, a sealing flange integrally attached to and extending completely around said rim and positioned substantially in a plane which is spaced from and parallel to said plane of said front surface;

a door means for closing said enclosure which is pivotably attached to said body means and which comprises a metal door face positioned substantially in a plane, four metal end faces attached to said door face and positioned substantially orthogonal thereto, a continuous urethane seal formed in situ on an interior surface of said door face and adapted to engage said sealing flange to seal said enclosure, said urethane seal positioned to engage the entire length of said sealing flange, a pair of hinges attached to said front surface for pivotably attaching said door means to said body means and providing a pivot axis for said door means which is positioned between the plane of said sealing flange and the plane of said front surface, said pivot axis is also positioned substantially parallel to two of said end faces and is positioned between these two of said end faces, and wherein cutouts are provided on one of said end faces to allow for pivotable movement of said door means greater than 180°;

wherein each of said hinges comprises a metal mounting flange substantially parallel to and attached to said front surface, a metal first plate attached to said mounting flange substantially orthogonal to said mounting flange, a metal second plate attached and substantially orthogonal to said first plate, a metal loop attached to said second plate, a metal hinge pin pivotably positioned within said loop, said pin defining said pivot axis and permanently attached to one of said end faces of said door means; and a latch provided on said door face to securely fasten the door means to the body means.

9. The enclosure of claim 8 wherein mounting holes are provided in four corners of said front surface to allow for reversible mounting of said hinges and said door.

10. The enclosure of claim 9 further comprising plugs to seal said mounting holes.

* * * * *